Dec. 29, 1964 G. A. O'SULLIVAN 3,163,042
RESISTANCE THERMOMETER SYSTEM
Filed Dec. 8, 1958 3 Sheets-Sheet 2

INVENTOR.
GEORGE A. O'SULLIVAN
BY Mason, Kolehmainen,
Rathburn and Wyss
ATTORNEYS.

Dec. 29, 1964 G. A. O'SULLIVAN 3,163,042
RESISTANCE THERMOMETER SYSTEM
Filed Dec. 8, 1958 3 Sheets-Sheet 3

INVENTOR.
BY GEORGE A. O'SULLIVAN
Mason, Kolehmainen, Rathburn and Wyss
ATTORNEYS.

United States Patent Office 3,163,042
Patented Dec. 29, 1964

3,163,042
RESISTANCE THERMOMETER SYSTEM
George A. O'Sullivan, Danbury, Conn., assignor, by mesne assignments, to Consolidated Controls Corporation, a corporation of New Mexico
Filed Dec. 8, 1958, Ser. No. 778,990
19 Claims. (Cl. 73—362)

The present invention relates to resistance thermometer systems, and, more particularly, to resistance thermometer systems wherein variations in the resistance of a measuring element with temperature are converted to an electrical output signal.

In the resistance thermometry art, certain arrangements have heretofore been proposed for producing electrical output signals indicative of the temperature to be measured. In the laboratory the resistance measuring element may comprise a spiral of high purity platinum wire which is freely suspended in a glass tube to avoid stressing the wire. Four leads are taken from this resistance element, two for supplying current to the element and two for voltage measurement. The resistance measurement may be made by a modified Wheatstone bridge of either the Mueller or Smith type, the bridge ordinarily being balanced to obtain a zero reading across the bridge diagonal and the resistance value of the resistance measuring element then being obtained by conventional bridge methods. When temperature measurements are made by means of a resistance measuring element in industrial plant applications the suspended platinum spiral is usually not sufficiently rugged and hence the platinum wire is usually secured to a suitable mounting element, which introduces a certain amount of stress, and the conduction losses along the stem of the thermometer, commonly called the immersion error, is somewhat larger than in the laboratory since the stem lines cannot be unreasonably large in commercial application. In addition, some self heating effect must be tolerated to obtain sufficient output power to drive subsequent electronic circuitry.

In addition to the above factors which introduce inaccuracies, the lead wires from the resistance thermometer element to the place of measurement may be subjected to wide variations in temperature and suitable compensation methods, such as the conventional three-wire resistance thermometer system, are widely used in industrial plant applications to compensate for lead wire variations.

When the measuring element is a Wheatstone bridge which is balanced each time a measurement is made and the resistance value is then obtained directly, the resistance measurements, which correspond to temperature readings, are substantially independent of the line voltage supplied to the bridge since this affects only the sensitivity of the bridge and not the accuracy of the resistance reading. In industrial plant applications a motor operated slide wire potentiometer may perform the function of rebalancing the bridge circuit. However, such motor operated slide wire potentiometers and their associated amplifiers are complicated and expensive and in many instances are not suitable for certain types of installations. Also, unless a relatively high gain servo system is employed to rebalance the bridge a relatively poor rate of response for the resistance thermometer system is obtained. Consequently, most industrial plant applications employ an unbalanced bridge arrangement wherein errors are introduced due to variations in line voltage, regulation and usually some deviation in linearity due to the loading effect of the bridge itself.

In addition to the above, when it is desired to replace resistance thermometer elements without recalibration of the measuring system, an additional error must be tolerated. This is due to the inability to produce identical resistance type sensing elements. If the resistance thermometer element is used in a conventional bridge circuit, it is usually necessary to standardize the resistance value of the element by a procedure commonly referred to as padding. By adding both a series and a parallel resistance, which have a zero temperature coefficient of resistivity, to the resistance thermometer element it is possible to bring a number of resistance thermometer elements within a close tolerance over the entire operating range of the thermometer. However, the series resistor of zero temperature coefficient dilutes the temperature coefficient of the resistance thermometer element and the parallel zero temperature coefficient resistor introduces a certain nonlinearity. Choosing the series and parallel resistance values in such a padding procedure is quite complicated and laborious and in some instances an electronic computer has been employed to determine the most suitable values for the series and parallel resistances used in padding the resistance thermometer elements to provide elements which are sufficiently identical to be replaceable in industrial plant applications.

It is, therefore, an object of the present invention to provide a new and improved resistance thermometer system wherein one or more of the disadvantages of the above described prior art arrangements are avoided.

It is another object of the present invention to provide a new and improved resistance thermometer system wherein parallel padding resistors are not required while providing a system having high reproducibility and interchangeability of resistance thermometer elements.

It is a further object of the present invention to provide a new and improved resistance thermometer system wherein an electrical output signal is provided which is proportional to temperature with respect to a predetermined reference point while providing a system which is substantially insensitive to line voltage regulation and loading due to the measuring circuit.

A further object of the present invention resides in the provision of a new and improved resistance thermometer system wherein resistance thermometer elements of widely different resistance values may be interchanged while providing substantially identical electrical output signal characteristics.

A still further object of the invention resides in the provision of a new and improved resistance thermometer system wherein an electrical output signal is provided which is linearly related to temperature with respect to a predetermined reference point.

It is another object of the present invention to provide a new and improved resistance thermometer system wherein the outputs of two or more resistance thermometer elements may be combined while providing a system which is substantially insensitive to line voltage fluctuations and loading due to the measuring circuit.

It is still another object of the present invention to provide a new and improved resistance thermometer system wherein the outputs of two or more resistance thermometer elements may be combined while providing a system wherein resistance thermometer elements of different resistance values may be interchanged without affecting the calibration of the system.

It is a still further object of the present invention to provide a new and improved resistance thermometer system wherein compensation for lead wire resistance is automatically provided.

It is a further object of the present invention to provide a new and improved resistance thermometer system which is substantially insensitive to line voltage fluctuations and loading while at the same time providing a rugged, relatively simple electronic circuit arrangement having stable long life characteristics.

Briefly, in accordance with one phase of the present invention, the resistance thermometer element of the present invention comprises a resistance measuring element, which may be of high purity platinum wire, for example, which is connected in series with a reference resistor having a zero temperature coefficient of resistivity, this reference resistor having the same resistance value as the platinum measuring element at one particular temperature. The reference resistor and platinum measuring resistor are arranged in a unitary structure and three lead wires are connected from this unitary measuring device to the temperature measuring system. A suitable regulation system is employed to provide a substantially constant current flow through the series connected reference resistor and the platinum resistance measuring element, this current through the series combination being held substantially constant despite variations in line voltage, loading, and the like. This is accomplished by providing a stabilized reference voltage which is compared with the voltage produced across the zero temperature coefficient reference resistor and the resultant error signal is employed to hold the votlage developed across the reference resistor constant so that a current which is inversely proportional to the resistance of the reference resistor flows through the series combination. An electrical output signal is derived which is proportional to the voltage across the platinum resistance measuring element minus the voltage across the reference resistor and it can be shown that this electrical output signal is not dependent upon the initial resistance of the platinum resistance element since the current through the element is inversely proportional to the initial resistance of the element by virtue of the fact that the voltage across the reference resistor is held constant and the resistance of the reference resistor is made equal to the resistance of the measuring element at a chosen initial temperature. Accordingly, the output signal is dependent only on the temperature coefficient of resistivity of the resistance element, in this case, platinum, which is employed. This means that when a different reference resistor and temperature measuring resistor combination is substituted in the system the electrical output signal will remain in calibration since the regulation system will function to provide a new value of constant current through the reference resistor which is sufficient to exactly match the fixed reference voltage of the system.

In accordance with a further phase of the present invention, compensation is made for changes in the temperature coefficient of resistivity of the material of the resistance measuring element within the range of temperatures to be measured so that an extremely linear electrical output signal is provided. This correction for non-linearity of the resistance material is accomplished by employing a combination of the voltage across the reference resistor and the voltage across the resistance measuring element itself for comparison to the reference voltage so that the current flowing through the series combination of the reference resistor and the resistance measuring element has a non-linearity compensation component.

In accordance with another phase of the present invention the same regulating system and resistance measuring element may be employed in conjunction with two zero temperature coefficient reference resistors to provide simultaneous measurement over two different temperature ranges. Also, two or more measuring element and reference resistor combinations may be combined to provide additive or subtractive functions of temperature which are insensitive to line voltage fluctuations, lead wire resistance and loading. If the two temperatures which are thus combined are within a relatively narrow temperature range one regulating system can be used for several measuring elements.

The invention, both as to its organization and method of operation, together with further objects and advantages thereof, will best be understood by reference to the following specification taken in connection with the accompanying drawings, in which.

Figure 1:
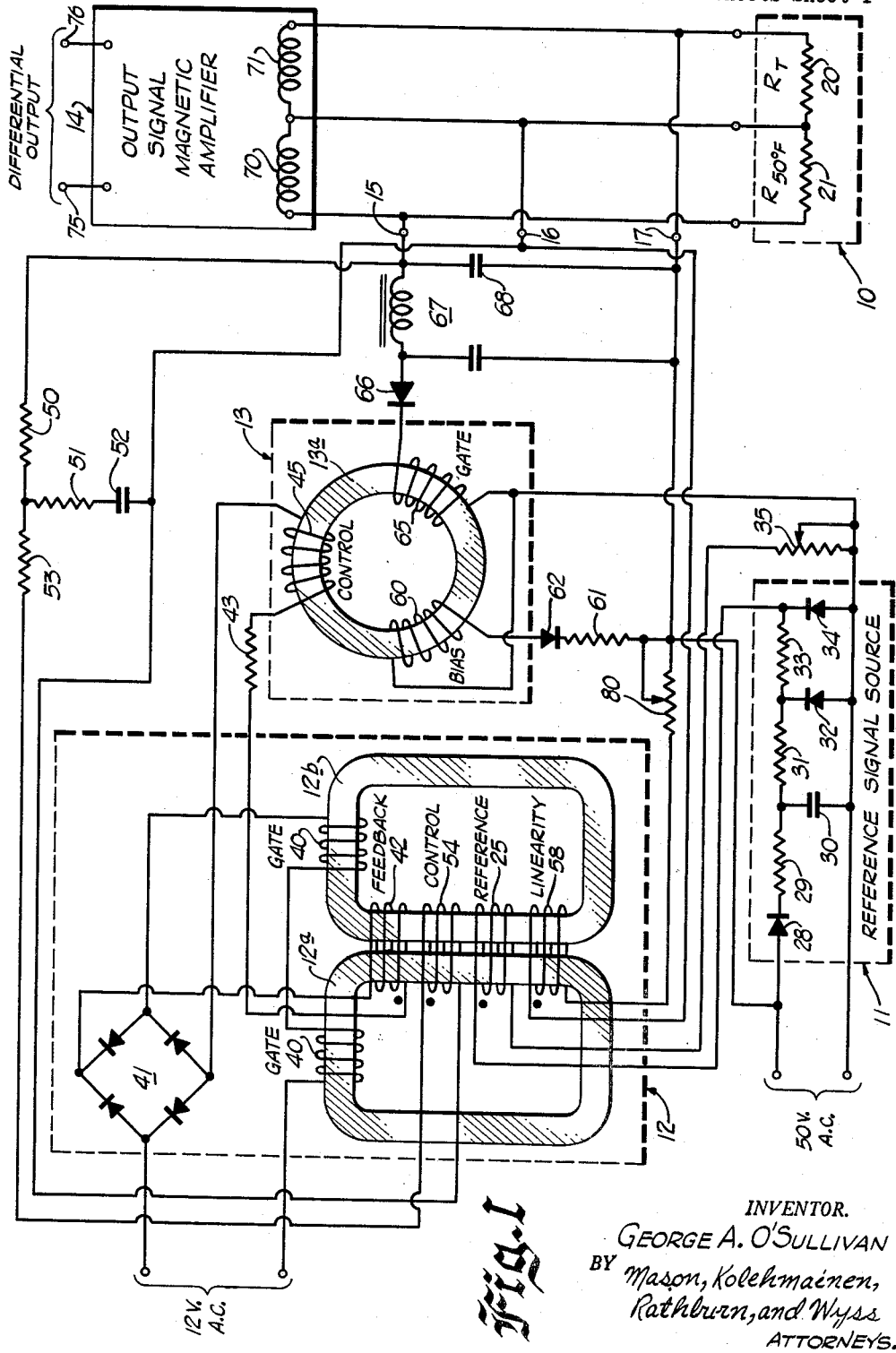
FIG. 1 is a schematic diagram of one embodiment of the resistance thermometer system of the present invention.

Referring now to the drawings and more particularly to FIG. 1 thereof, the resistance thermometer system of the present invention is therein illustrated as comprising a temperature measuring unit indicated generally at 10, a reference signal source indicated generally at 11, a first magnetic amplifier indicated generally at 12, a second magnetic amplifier indicated generally at 13 and an output signal magnetic amplifier indicated at 14. The temperature measuring unit 10 comprises a temperature measuring resistance element 20, also identified as the resistor $R_T$, which preferably comprises a resistance material having a known and repeatable curve of resistance versus temperature such as platinum, molybdenum, copper or tungsten, this element usually being in the form of a resistance wire wound or otherwise supported on a suitable form. The measuring unit 10 also comprises, in accordance with an important feature of the present invention, a reference resistor 21, also indicated as the resistor $R_{50° F.}$, which is made of a resistance material having a substantially zero temperature coefficient of resistivity, such as manganin or constantin. The reference resistor 21 has a resistance value equal to the resistance of the temperature measuring resistance element 20 at some predetermined temperature. For example, the reference resistor 21 may have a resistance value equal to the resistance of the temperature measuring element 20 at 50° F.

In accordance with the present invention, a constant voltage is maintained across the reference resistor 21, i.e., the terminals 15, 16, this constant voltage being produced by means of a regulation system which compares a voltage produced by the reference signal source 11 with a control signal derived from the reference resistor 21. Considering first the reference signal source 11, this source may comprise any suitable arrangement for providing a highly stable reference signal which does not vary with line voltage, line frequency, temperature, or other disturbing factors, this reference signal being supplied to a reference winding 25 on the first magnetic amplifier 12 of the regulating system. In the illustrated embodiment an A.C. voltage of approximately 50 volts amplitude is supplied to a rectifier 28 in series with a resistor 29 and filter condenser 30 so that a filtered half wave rectified voltage is produced across the condenser 30. The voltage produced across the condenser 30 is then stabilized in a first Zener diode regulating section comprising a resistor 31 and Zener diode 32 which are connected in series across the condenser 30. As will be readily understood by those skilled in the art, the Zener diode 32 comprises a p-n junction of semiconductors which shows a predictable Zener breakdown voltage in which region the current in the inverse direction rises rapidly with a slight increase in voltage so as to provide a highly regulated voltage drop across the reversely connected Zener diode 32. In order to provide further stabilization a second Zener diode section is employed which comprises a resistor 33 and a Zener diode 34 which are connected in series across the Zener diode 32 so that a more highly regulated voltage of somewhat smaller amplitude is produced across the Zener diode 34. The reference winding 25 on the magnetic amplifier 12 is then connected across the Zener diode 34 in series with a level setting potentiometer 35, the potentiometer 35 being provided for the purpose of adjusting the current through the reference winding 25 so that this reference current signal can be set to a desired level as determined by the electrical output signal required for a given change in temperature. In addition, the potentiometer 35 may be adjusted to compensate for changes in the Zener diode characteristics. Thus, the regulated reference voltage produced across the diode 34 tends to increase approximately 0.02% per degree centigrade whereas the copper in the reference winding 25 tends to increase in resistance at the rate of .39% per degree centigrade. The resistance of the potentiometer 35 is chosen so that the ratio of the resistance of the winding 25 to the total circuit resistance (resistance of winding 25 plus resistance of potentiometer 35) multiplied by .39 is approximately equal to .02. With this arrangement, as the voltage developed across the Zener diode 34 increases the increase in resistance of the winding 25 will also rise proportionately so that a substantially constant reference current will flow through the winding 25 which is unaffected by ambient temperature.

Considering now the magnetic amplifier 12, in the illustrated embodiment this amplifier is of the full wave type shown and described in detail in the treatise entitled "Magnetic Amplifier Circuits," by William Geyger (McGraw-Hill, 1957). Thus, the amplifier 12 includes a pair of gate windings 40 which are connected in series with a bridge type rectifier circuit indicated generally at 41 to the power supply voltage of 12 volts A.C. An external feedback circuit is provided which includes a positive feedback winding 42 connected to the bridge rectifier 41 and through a resistor 43 to the control winding 45 of the second magnetic amplifier 13 to provide high open loop gain for the amplifier 12. In order to derive a control signal from the reference resistor 21, the voltage produced across this resistor is connected through a series resistor 50, the shunt combination of a resistor 51 and a condenser 52, and a further series resistor 53 to a control winding 54 on the magnetic amplifier 12, the combination of the resistors 50 and 53 and the condenser 52 providing a stabilizing network to prevent self oscillations within the system, as will be readily understood by those skilled in the art. A linearity winding 58 is also provided in the magnetic amplifier 12 to correct for variations in the temperature coefficient of resistivity of the temperature measuring element 20, as will be described in more detail hereinafter.

Considering now the second magnetic amplifier 13, in the illustrated embodiment this amplifier is of the half wave type shown and described in the above identified book by Geyger and includes, in addition to the control winding 45, a bias winding 60 which is energized from the 50 volt A.C. supply through a resistor 61 and a rectifier 62 so as to control the flux operating level in the core of the magnetic amplifier 13 in conjunction with the control winding 45, it being understood that current flows through the bias winding 60 during alternate half cycles when the control winding 45 is open circuited so as to control resetting of the flux level in the core of the amplifier 13. In this connection it will be understood that the 12 volt A.C. source and the 50 volt A.C. source are synchronous one with the other and preferably are derived from different windings on the same power transformer, as will be readily apparent to one skilled in the art. An output gate winding 65 of the magnetic amplifier 13 is provided to supply an output rectifier 66 and a pi filter network indicated generally at 67 so as to provide a substantially unidirectional voltage across the output condenser 68 of the filter 67. The voltage produced across the condenser 68 is applied through the terminals 15, 17 to the series combination of the reference resistor 21 and the temperature measuring resistance element 20 so as to produce a current flow through these series connected elements.

The voltage developed across the reference resistor 21 by virtue of the above described current flow therethrough is applied to one input coil 70 of the output signal magnetic amplifier 14. The voltage produced across the temperature measuring resistance element 20 by current flow therethrough is supplied to the other input coil 71 of the amplifier 14 and this amplifier functions to compare the signals supplied to the windings 70 and 71 and produces at the output terminals 75 and 76 thereof a unidirectional voltage which is proportional to the difference in voltages produced across the elements 21 and 20.

Considering now the operation of the temperature measuring system of the present invention, it will be evident that when the temperature being measured is 50° F. the resistance of the temperature measuring resistance element 20 will be equal to the resistance of the reference resistor 21 and since the same current flows through both of these elements the voltages produced across these elements will be equal so that a zero output signal will be produced at the output terminals 75 and 76 of the system. As the temperature being measured increases the resistance of the measuring element 20 will increase and if the output voltage developed by the magnetic amplifier 13, i.e., the voltage produced across the condenser 68, remained constant the current through the series combination of the elements 21 and 20 would decrease due to the increased series resistance of the combination. However, in accordance with the present invention the voltage across the reference resistor 21 is held constant since if the voltage across the reference resistor 21 tends to change as the resistance of the measuring element 20 increases, an error signal is produced with respect to the fixed reference current flowing through the reference winding 25 and the magnetic amplifiers 12 and 13 have sufficient gain to increase the voltage produced across the condenser 68 so that the voltage across the reference resistor 21 is held at a substantially constant value. Accordingly, as the temperature increases and the resistance of the measuring element 20 increases the voltage across the resistor 21 remains substantially constant due to the regulation system of the present invention although the voltage across the condenser 68 must necessarily increase to maintain this constant voltage condition across the reference resistor 21.

Considering now the character of the output signal developed by the magnetic amplifier 14, it will be noted that the following equations can be written on the basis of the constant voltage maintained across the reference resistor 21:

$$i = \frac{E_{21}}{R_{21}} \quad (1)$$

$$E_{21} = E_{ref} \quad (2)$$

$$E_{20} = iR_{20} \quad (3)$$

Where $i$ is the current flowing through the series combination of the reference resistor 21 and the temperature measuring resistor 20, $E_{21}$ is the voltage across the resistor 21, $E_{20}$ is the voltage across the element 20, $R_{21}$ is the resistance of the resistor 21, $R_{20}$ is the resistance of the element 20 and $E_{ref}$ is the constant reference voltage developed across the reference winding 25.

Substituting Equation 1 in Equation 3 we have for $E_{20}$:

$$E_{20} = \frac{E_{ref} R_{20}}{R_{21}} \quad (4)$$

The magnetic amplifier 14 measures the difference in voltage across the resistors 21 and 20 and hence the voltage output, $E_{out}$, can be written as follows:

$$E_{out} = E_{20} - E_{21}$$
$$= \frac{R_{20} - R_{21}}{R_{21}} \times E_{ref} \qquad (5)$$

However, since the resistance of the measuring element 20 is equal to the resistance of the reference resistor 21 at a particular temperature the resistance of the measuring element 20 may be expressed in terms of the reference resistor 21 as follows:

$$R_{20} = R_{21}(1 + \alpha T) \qquad (6)$$

Where $\alpha$ is the temperature coefficient of resistivity of the measuring element 20 and T is the temperature being measured.

Substituting Equation 6 in Equation 5 we have:

$$E_{out} = \alpha T E_{ref} \qquad (7)$$

It will thus be evident from Equation 7 that the signal output of the amplifier 14 is entirely independent of the resistance of the measuring element 20 and varies only with alpha, the temperature coefficient of resistivity of the measuring element 20, and the temperature. This is because $E_{21}$ remains constant due to the above described regulation circuit which maintains the current through the reference resistor 21 constant and inversely proportional to the resistance of the reference resistor 21 itself.

Accordingly, the output signal derived from the magnetic amplifier 14 comprises an electrical signal which varies with temperature and is dependent only on the temperature coefficient of resistivity of the material of the measuring element 20. Furthermore, and in accordance with an important feature of the invention, this output signal may be accurately reproduced when a measuring unit 10 of the same material but having a different resistance value at the same reference temperature is substituted. Thus, let us assume that the resistance of the measuring element 20 is 90 ohms at 50° F. and a new measuring unit is substituted wherein the new temperature measuring element 20 and reference resistor have a resistance of 95 ohms at 50° F. When the new unit is substituted for the old unit the regulating system of the present invention will function to provide a current through the series combination of the reference resistor and the measuring element such that the voltage across the new reference resistor is the same as that produced across the reference resistor of the previous unit. This is because the control signal derived from the reference resistor 21 is compared to a fixed reference current which is derived from the reference signal source 11 and flows through the reference winding 25. Accordingly, the electrical output signal from the magnetic amplifier 14 remains completely calibrated even though temperature measuring units having widely different resistance measuring elements are employed. It will also be noted that the system of the present invention provides lead wire compensation since the wires connected to the outer ends of the amplifier input coils 70, 71 produce oppositely polarized voltages which cancel in the differential input circuit of the amplifier 14.

The temperature coefficient of resistivity, alpha, of materials, such as platinum, molybdenum, etc., which are widely used in temperature responsive measuring elements because of their high purity and reproductibility, is sufficiently constant for many applications. However, the temperature coefficient of resistivity of these materials does vary substantially, particularly when measurement is made over a wide temperature range. For example, the temperature coefficient of resistivity of platinum may vary as much as 5° F. over a range of from 50° F. to 750° F. In situations wherein high accuracy of indication is required or where the output signal is to be employed for computing purposes, it is desirable to improve the linearity of response of the temperature measuring system so that it is better than the actual temperature measuring element. In accordance with a further feature of the present invention, correction for the non-linearity of the temperature coefficient of resistivity of the material used in the temperature measuring element 20 may be conveniently provided by adding a small component of voltage proportional to the voltage produced across the temperature measuring element itself to the control signal which is compared to the reference signal in the magnetic amplifier 12. More particularly, in order to correct for non-linearity of the resistance measuring element 20 a signal proportional to the voltage developed across the measuring element 20 is applied to a linearity winding 58 on the magnetic amplifier 12 and a potentiometer 80 is provided in series therewith to adjust the magnitude of the component supplied to the regulating system which is proportional to the voltage produced across the measuring element 20. The temperature coefficient of resistivity follows a known curve which can be approximated by either a parabola or an hyperbola. If the measuring element 20 is platinum the temperature coefficient of resistivity tends to drop off with increasing temperatures and an hyperbolic correction factor may be introduced into the system by means of the linearity winding 58 which is connected so that it has the same polarity as the reference winding 25. It has been found that with such a correction factor the error due to non-linearity of the temperature coefficient of resistivity can be reduced from 5° F. to 0.3° F. maximum error over a range of 50° F. to 750° F. If, on the other hand, the measuring element of a material such as molybdenum whose temperature coefficient of resistivity increases with higher temperatures the proper correction factor may be introduced by reversing the polarity of the linearity winding so that it has the same polarity as the control winding 54, it being understood that with either type of correction the potentiometer 80 may be adjusted to give the required amount of second order correction for the particular measuring element that is used. In addition, the correction provided by the signal supplied to the linearity winding 58 may be employed to compensate for changes in resistance of the control winding 54 with temperature so that both the reference winding 25 and control winding 54 are temperature compensated. However, it will be understood that in certain applications the temperature coefficient of resistivity of the measuring element 20 will not undergo sufficient variation over the measured temperature range to cause objectionable non-linearity in the output signal in which case the linearity winding 58 and potentiometer 80 are not required.

While the amplifiers 12, 13 and 14 are illustrated in FIG. 1 as comprising magnetic amplifiers of a particular configuration, it will be understood that any other type of suitable signal amplifying arrangement may be employed in lieu thereof. For example, these amplifiers may comprise any suitable arrangement of vacuum tubes, transistors, or the like, which is capable of comparing the reference signal derived from the reference signal source 11 with the control signal derived from the reference resistor 21 and supplying a suitable energizing potential to the measuring unit 10. Also, in certain situations the amplification provided by the magnetic amplifier 14 is not required. For example, if the range of temperature being measured is quite large, the difference in voltages produced across the reference resistor 21 and the measuring element 20 may be measured by a suitable meter arrangement, as described in more detail in connection with FIG. 2.

For purposes of illustration, and not in any sense by way of limitation, it has been found that the toroidal cores 12a and 12b of the magnetic amplifier 12 may be wound from a ¼ inch ribbon of 50% iron-50% nickel grain oriented magnetic tape of one mil thickness having a saturation flux of fourteen kilo-gauss, the finished core having an inside diameter of ¾ inch and an outside diameter of 1 inch. The gate windings 40 each comprise a winding of 900 turns of No. 38 wire, the feedback winding 42, which is wound around both cores, comprises a winding of 900 turns of No. 38 wire, the control winding 54, which is wound around both cores, comprises a winding of 5400 turns of No. 40 wire, the reference winding 25, which is wound around both cores comprises a winding of 1100 turns of No. 38 wire, and the linearity winding 58, which is also wound around both cores, comprises a winding of 200 turns of No. 36 wire. The core 13a of the magnetic amplifier 13 is similar to the cores 12a and 12b of the amplifier 12, the core 13a being wound from a 3/8 inch ribbon of 2 mil thickness and having an inside diameter of 1 inch and an outside diameter of 1½ inches. The control winding 45 of the magnetic amplifier 13 comprises a winding of 200 turns of No. 35 wire, the bias winding 60 comprises a winding of 150 turns of No. 35 wire, and the gate winding 65 comprises a winding of 2250 turns of No. 30 wire. In the illustrated example, the output from the Zener diode 34 was approximately six volts, the resistor 53 had a value of 1,000 ohms, the resistor 50 had a value of 400 ohms, the resistor 51 had a value of 600 ohms, the condenser 52 had a value of 250 microfarads and the potentiometers 35 and 80 may be 1,000 ohms each. Such an arrangement was employed in connection with a measuring unit in which the temperature measuring element 20 had a nominal resistance of 90 ohms and the resistance of the reference resistor 21 was equal to the resistance of the measuring element at a particular temperature reference value.

In certain situations it is desirable to measure temperature at a particular location over both a wide temperature range and a narrow temperature range simultaneously. This may be done by means of a single temperature measuring resistance element in accordance with the present invention. Thus, referring to FIG. 2, there is provided a measuring element 10a which includes the reference resistor 21 and the temperature measuring resistance element 20, these elements having the same resistance at 50° F. and the reference resistor 21 having a zero temperature coefficient of resistivity as described in detail heretofore in connection with FIG. 1. In addition, the measuring unit 10a includes a second reference resistor 85, which is also identified in the drawing as $R_{420°\,F.}$, which is connected in series with the elements 21 and 20 across the output condenser 68 of the regulating system. The second reference resistor 85 has a zero temperature coefficient of resistivity and has a resistance equal to the temperature of the temperature measuring element 20 at 420° F.

Figure 2:
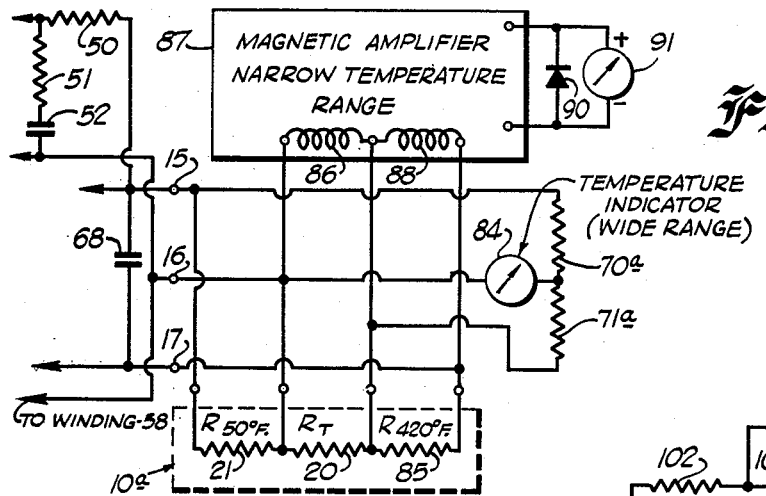
FIG. 2 is a schematic diagram of a portion of an alternative embodiment of the invention showing the use of one measuring element for simultaneous temperature measurement in two different ranges.

In the system of FIG. 2 the difference in voltages produced across the measuring element 20 and reference resistor 21 is measured by providing a pair of load resistors 70a and 71a, which correspond to the input windings 70 and 71 of the magnetic amplifier 14 of FIG. 1 and a meter 84 is connected between the junction point of the resistors 20, 21 and the junction point of the resistors 70a, 71a. This simple type of meter indicating circuit may be used wherever the difference voltage output is sufficiently large to operate the succeeding indicating or control circuit, as in the wide temperature range measuring application of FIG. 2. However, in order to provide a narrow temperature range signal a magnetic amplifier 87 may be required, the voltage which is produced across the measuring element 20 being supplied to the first input winding 86 of the magnetic amplifier 87 and the voltage produced across the second reference resistor 85 being supplied to a second input coil 88 of the magnetic amplifier 87. The amplifier 87 functions in a manner similar to the amplifier 14 to produce a direct current output signal which is proportional to the difference in voltages produced across the measuring element 20 and the second reference resistor 85. When the measured temperature is below the narrow range reference point of 420° F. the amplifier 87 develops a negative output signal but this signal is shunted through a rectifier 90 so that no deflection of the narrow range output meter 91 is produced. However, at 420° F. the resistance of the measuring element 20 is equal to the resistance of the second reference resistor so that a zero output signal is produced by the magnetic amplifier 87 and as the temperature continues to increase a positive electrical output signal is developed by the magnetic amplifier 87 which is proportional to the variations in temperature above 420° F., it being understood that when the output signal from the amplifier 87 changes polarity the rectifier 90 is reverse biased and no longer shunts the meter 91. In this connection it will be understood that the remaining portions of the regulating system not shown in FIG. 2 are identical to the corresponding elements of the system of FIG. 1 and the regulating system functions in connection with the measuring element 10a of FIG. 2 in a manner identical to that described in detail heretofore to maintain a constant voltage across the reference resistor 21 so that all of the above discussed features of stability and replaceability are achieved.

Figure 3A:
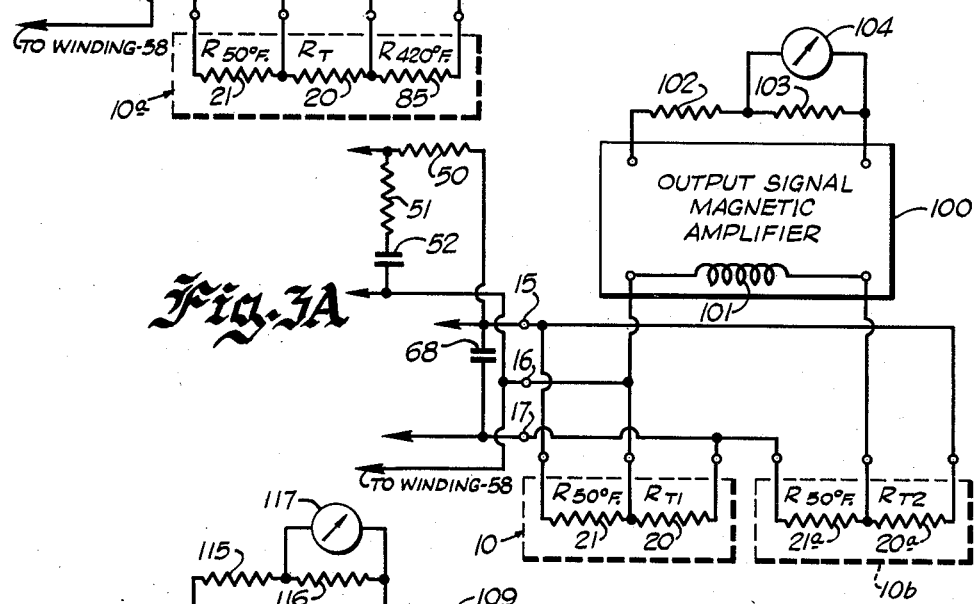
FIGS. 3A and 3B are schematic diagrams of portions of further alternative embodiments of the invention showing the addition of two temperature measuring elements.

In certain instances it is desirable to provide an electrical signal which is proportional to the average of several temperatures. In the system shown in FIG. 3A there is shown an arrangement for obtaining the average of two temperature measurements while employing only one resistance thermometer regulating system. Referring to this figure, a first measuring unit 10 is illustrated as measuring the temperature at one location and a second unit 10b is provided to measure the temperature at a different location. The unit 10 comprises a reference resistor 21 and temperature measuring element 20 which are connected to the regulating system in the manner shown in FIG. 1, it being understood that the portion of the regulating system not shown in FIG. 3A corresponds to that described in detail in connection with FIG. 1. However, the output signal amplifier 14 of FIG. 1 is replaced in FIG. 3A by a single coil input amplifier 100 the input coil 101 of which is connected between the junction of the resistors 21, 20 of the unit 10 and the junction of the reference resistor 21a and temperature measuring element 20a of the unit 10b. It will be noted that the temperature measuring element 20a and the reference resistor 21a of the unit 10b are reversely connected in series across the regulated supply voltage developed across the condenser 68. Accordingly, if the temperature of the location of the unit 10 increases the resistance of the temperature measuring element 20 increases so that a larger voltage drop is produced across this element. This results in an increase in the potential applied to the left hand end of the input coil 101 of the amplifier 100. If the temperature at the location of the other measuring unit 10b remains the same the potential applied to the right hand end of the coil 101 does not change so that a net positive potential is developed across the coil 101 which produces a corresponding output signal from the amplifier 100. On the other hand, if the temperature at the location of the unit 10b also increases the resistance of the temperature measuring element 20a will increase so that the potential applied to the right hand end of the coil 101 becomes more negative, thereby increasing the potential appearing across the coil 101. It will thus be evident that the signal applied to the input coil 101 is the sum of the voltage changes produced by temperature variations at the two locations. In the output circuit of the magnetic amplifier 100 there is provided a voltage divider which comprises the resistors 102 and 103, an indicating meter 104 being connected across the resistor 103. The resistors 102 and 103 are so chosen that the output signal from the amplifier 100 is reduced by a factor of two so that the signal indicated on the meter 104 represents the average of the two temperatures at the locations of the units 10 and 10b.

If it is assumed that the temperatures measured at the two locations are within the same general temperature range, a single regulating system may be employed to maintain the voltage constant across the reference resistor 21 and the temperature averaged output signal will be substantially unaffected by changes in line voltage, line frequency, etc. However, a correction for non-linearity of the temperature coefficient of resistivity of the measuring element can only be made for one of the measuring units 10 or 10b.

Figure 3B:
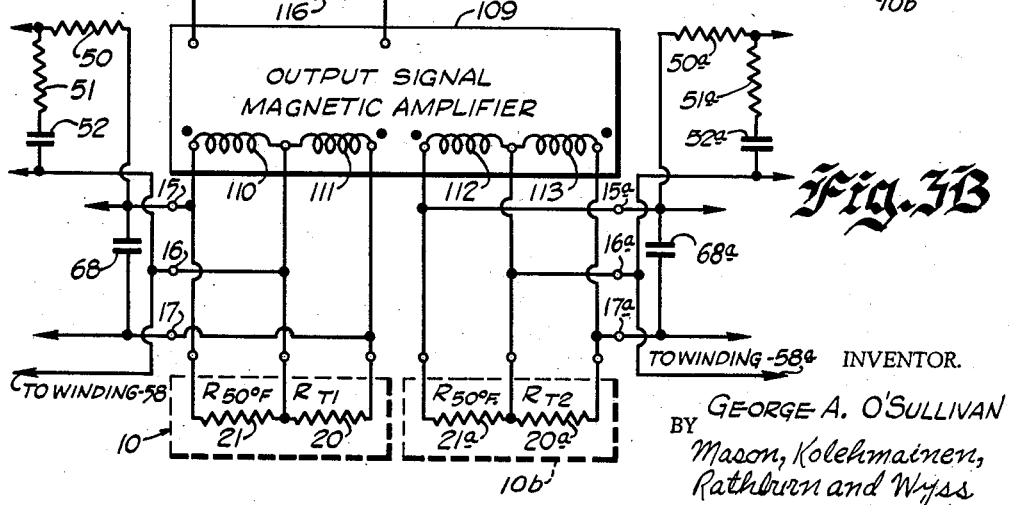

In the system of FIG. 3B an alternative arrangement is shown for obtaining the average of temperatures at two different locations by means of the measuring units 10 and 10b. In the system of FIG. 3B a separate regulating system is employed for each measuring unit. Thus, a first regulating system is employed with the measuring unit 10 which comprises the reference resistor 21 and the temperature measuring element 20, the output condenser 68 of this regulating system being shown in FIG. 3B, it being understood that the remaining portions of this first regulating system correspond to those shown in detail in FIG. 1 of the drawings. In a similar manner a second regulating system which includes the output condenser 68a is employed for the unit 10b, it being understood that similar elements in the two systems are given the same reference numerals with the addition of "a" to the components of the second system. When two separate regulating systems are employed a different type of output magnetic amplifier is employed wherein a separate input coil is provided for each of the reference resistors and temperature measuring elements of each measuring unit. Thus, a first input coil 110 is provided to measure the voltage produced across the reference resistor 21 and a second differentially connected input coil 111 is provided to measure the voltage produced across the temperature measuring element 20. In a similar manner, a third input coil 112 is provided to measure the voltage produced across the reference resistor 21a of the second measuring unit 10b and a fourth input coil 113 which is differentially connected with respect to the input coil 112 is provided to measure the voltage produced across the temperature measuring element 20a. The respective input coils of the output signal amplifier 109 are so connected that the difference voltages produced by each measuring unit are additively combined and the output of the amplifier is supplied to a voltage divider comprising the resistors 115 and 116 so that an indication of average temperature is provided by the meter 117. In this connection it will be understood that any number of temperature measurements may be combined by providing additional differentially connected input coils for the amplifier 109. It is also pointed out that in the system of FIG. 3B the temperatures being measured at the various locations may differ widely in the value since the several measuring units are not interconnected to a common regulating system as in the system of FIG. 3A.

Figure 4A:
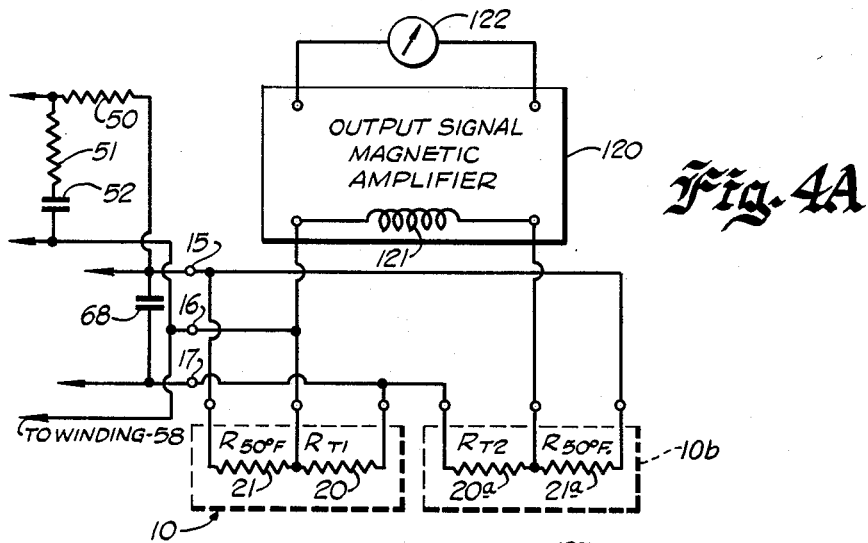
FIGS. 4A and 4B are schematic diagrams of portions of other alternative embodiments of the invention in which the difference of two temperature measuring elements is obtained.

In certain other instances it is desirable to provide an electrical output signal which is proportional to a temperature difference. For example, when it is desired to compare the input and output temperatures of a process and the process temperatures are of relatively high value it is difficult to reference both the input and output temperatures to zero and accordingly the input temperature may be referenced to the output temperature and by knowing the difference between the input and output temperatures the control function can be effected. In order to provide an arrangement wherein an electrical output signal is produced which is proportional to the difference of two temperature measurements, the system shown in FIG. 4A may be employed wherein the temperature measuring unit 10 is subtractively compared to the temperature measuring unit 10b. In the system of FIG. 4A only a single regulating system is required, the output condenser 68 of this system being shown in FIG. 4A, it being understood that the remaining portions of the regulating system correspond to those shown and described in detail heretofore in connection with FIG. 1. In the system of FIG. 4A an output amplifier 120 is provided the input coil 121 of which is connected between the junction point of the resistors 21, 20 of the first measuring unit 10 and the junction of the resistor 21a, 20a of the second measuring unit 10b. However, in the system of FIG. 4A the second measuring unit 10b is not reversely connected but instead the reference resistors 21 and 21a are connected in parallel with each other through the input coil 121. If the temperature at the location of the measuring unit 10 increases the voltage produced across the measuring element 20 will increase so that the voltage applied to the left hand end of the input coil 121 becomes positive. However, if the temperature at the location of the measuring unit 10b also increases the voltage produced across the measuring element 20a increases positively so that the right hand end of the coil 121 increases positively and the net voltage produced across the coil 121 decreases. It will thus be evident that the input coil 121 measures the difference in temperatures at the two locations, this difference being indicated on the output meter 122 connected to the output terminals of the amplifier 120. The regulating system of FIG. 4A functions to maintain the voltage produced across the reference resistor 21 constant despite changes in line voltage, loading, etc., and if the temperatures being measured at the two locations are within the same general temperature range the common regulating system will function to provide regulation for both measuring units.

Figure 4B:
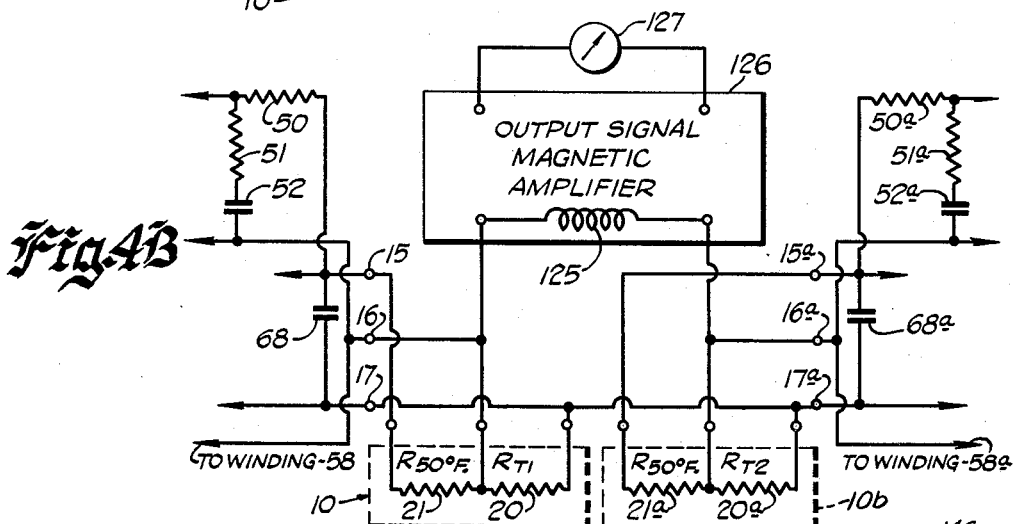

In the event that the temperatures being subtracted are widely different the arrangement shown in FIG. 4B may be employed wherein a separate regulating system is provided for each of the measuring units 10 and 10b. Referring to this figure, the first regulating system is provided for the measuring unit 10, the output condenser 68 of this system being shown in FIG. 4B and the other portions of the system not shown in FIG. 4B being identical to that described in detail in connection with FIG. 1. In a similar manner the second regulating system includes the output condenser 68a which provides an energizing potential for the second measuring unit 10b. In the system of FIG. 4B the terminals 17 and 17a of the respective regulating systems are connected together and the input coil 125 of the output amplifier 126 is connected between the terminals 16 and 16a of the respective regulating system. If the temperature at the location of the unit 10 increases the voltage produced across the element 20 will increase so that the potential applied to the left-hand end of the coil 125 increases positively. However, if the temperature at the location of the unit 10b increases the voltage produced across the measuring element 20a will also increase so as to decrease the net voltage produced across the input coil 125. The output meter 127 connected in the output of the amplifier 126 thus measures the difference in signals produced by the respective measuring units 10 and 10b. However, since the two regulating systems are interconnected by means of the output amplifier 126 and the connection between the terminals 17 and 17a, it is necessary to provide exactly the same reference current for the two regulating systems. This may be readily accomplished by employing a single reference signal source 11 for both regulating systems and connecting the reference winding 25 and level setting potentiometer 35 of each regulating system across the Zener output diode 34 (FIG. 1) of the common reference signal source 11, as will be readily understood by those skilled in the art. With this arrangement, the desired temperature difference signal may be provided over a wide range of temperatures and non-linearity correction may be provided for each of the measuring units through the respective regulating system associated therewith.

Figure 5:
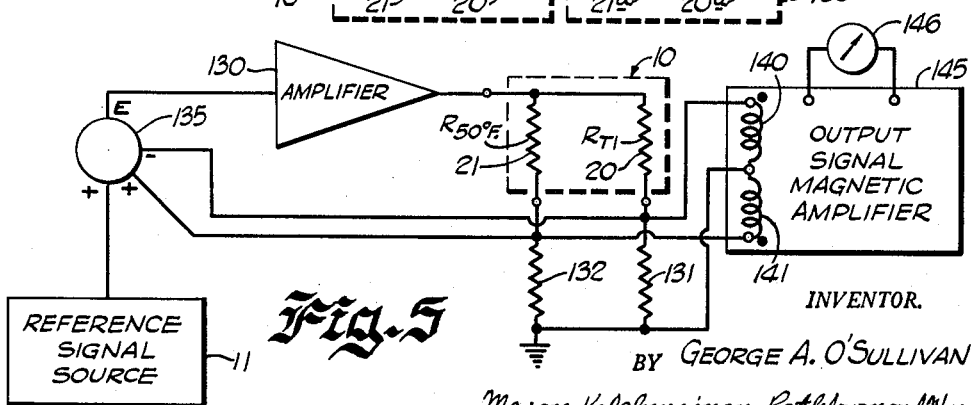
FIG. 5 is a block diagram of a further alternative embodiment of the resistance thermometer system of the present invention.

In FIG. 5 of the drawings there is shown an alternative embodiment of the invention wherein regulation against line voltage changes, loading, and the like is achieved in a somewhat different manner from that of FIG. 1. Thus, referring to FIG. 5, the temperature measuring unit 10 comprises the reference resistor 21 and the temperature measuring element 20 as in FIG. 1, the reference resistor 21 having a substantially zero temperature coefficient of resistivity and having the same resistance value as the temperature measuring element 20 at a particular reference point. However, in the system of FIG. 5 the output signal from the amplifier 130, which amplifier corresponds to the amplifiers 12 and 13 of FIG. 1, is applied to the reference resistor 21 and temperature measuring element 20 in parallel and the regulating system is arranged so as to maintain the current through the temperature measuring element 20 substantially constant despite changes in line voltage, loading, and the like. This is accomplished by providing a small resistor 131 in series with the temperature measuring element 20 so that a voltage is produced across the resistor 131 which is proportional to the current flowing through the temperature measuring element 20. The voltage produced across the resistor 131, which is proportional to current flow through the temperature measuring element 20 is compared with a reference current derived from the reference signal source 11 in a comparing device indicated generally at 135 and the resultant error signal is supplied to the input of the amplifier 130. In this connection it will be understood that the comparing device 135 and amplifier 130 correspond to the magnetic amplifiers 12 and 13 of FIG. 1 wherein the comparison between the reference current and the control signal derived from the measuring unit is effected by the reference winding 25 and control winding 54 of the amplifier 12. In the system of FIG. 5 the electrical output signal is made proportional to the difference in currents flowing through the reference resistor 21 and the temperature sensitive resistor 20. To this end another small resistor 132 is connected in series with the reference resistor 21 so that a voltage is produced across the resistor 132 which is proportional to current flow through the reference resistor 21. The voltages produced across the resistors 131 and 132 are applied to the oppositely polarized input coils 140 and 141, respectively, of an output signal amplifier 145 so that an electrical output signal is supplied to the indicating device 146 or other controlling element which is proportional to the difference in current flow through the element 20 and the reference resistor 21. The resistors 131 and 132 are chosen to have identical resistance values and at the indicated temperature reference point of 50° F. the element 20 and the reference resistor 21 have the same resistance value so that identical currents flow through the resistors 131 and 132. Accordingly, a zero signal output is derived from the amplifier 145. As the temperature increases the resistance of the temperature measuring element 20 also increases so that the current through the resistor 131 would tend to decrease. However, the voltage produced across the resistor 131 is compared to the fixed reference current supplied by the signal source 11 and the amplifier 130 functions to readjust the voltage applied to the parallel combination of the measuring element 20 and the reference resistor 21 so that the current through the element 20 remains substantially constant. This means that the voltage produced by the amplifier 130 must increase as the resistance of the element 20 increases. Since the reference resistor 21 does not change its resistance value with temperature the increased voltage applied to the reference resistor 21 causes an increase in the current flow through the resistor 132 so that a positively increasing output signal is derived from the amplifier 145 and is indicated on the meter 146. It can be shown that the difference in currents flowing through the temperature measuring element and reference resistor 21 is proportional to the temperature coefficient of resistivity and temperature, as in the system of FIG. 1, and the output signal supplied to the meter 146 is not dependent upon the resistance of the measuring element 20 itself. Accordingly, if a new measuring unit is substituted wherein the measuring element 20 has a substantially different resistance value the regulating system of FIG. 5 will function to provide an energizing voltage for the new parallel combination of the element 20 and reference resistor 21 such that the current flow through the resistor 131 is exactly equal to the reference current derived from the reference signal source 11 and the electrical output signal supplied to the meter 146 will be completely calibrated for the new measuring unit so that complete interchangeability of temperature measuring units is provided. In this connection it will be understood that the resistors 131 and 132 are preferably of relatively small value so as not to disturb the current relationship between the measuring element 20 and the reference resistor 21. If desired, the resistors 131 and 132 may comprise the resistance portions of the input coils 140 and 141 of the output signal amplifier 145, as will be readily understood by those skilled in the art. In addition, in the system of FIG. 5 correction for non-linearity of the temperature coefficient of resistivity of the temperature measuring unit 20 may be provided by supplying a control signal component proportional to the current flowing through the reference resistor 21, i.e., the voltage produced across the resistor 132, this second order correction component being supplied to the comparison device 135 in the same polarity as the reference signal from the source 11 when a measuring element 20 of platinum, or similar material having a drooping temperature coefficient characteristic is employed.

While there have been illustrated and described what are at present considered to be the preferred embodiments of the present invention, it will be apparent that various changes and modifications thereof will occur to those skilled in the art. It is intended in the appended claims to cover all such changes and modifications as fall within the true spirit and scope of the present invention.

What is claimed as new and is desired to be secured by Letters Patent of the United States is:

1. A resistance thermometer system, comprising a source of electrical power, a first resistance element having a substantially zero temperature coefficient of resistivity, a second resistance element having a temperature coefficient of resistivity such that the resistivity of said second element changes substantially over a given temperature range, said first and second elements having the same resistance at a predetermined temperature, means connecting said first and second elements in circuit with said source of electrical power, a stabilized reference signal source, means for comparing a reference signal derived from said reference signal source with a signal derived from said first resistance element, means controlled by said comparing means for automatically maintaining the voltage supplied to said first resistance element substantially constant, and means for deriving an electrical output signal from said first and second elements proportional to the electrical signal difference therebetween.

2. A resistance thermometer system, comprising a source of electrical power, a first resistance element having a substantially zero temperature coefficient of resistivity, a second resistance element having a temperature coefficient of resistivity such that the resistivity of said second element changes substantially over a given temperature range, said first and second elements having the same resistance at a predetermined temperature, means connecting said first and second elements in circuit with said source of electrical power so that current therefrom flows through both said first and second resistance elements, means for developing a stable reference signal, means jointly controlled by said reference signal and an electrical signal derived from said first resistance element for automatically maintaining the voltage supplied to said first resistance element substantially constant, and means for deriving a differential output signal from said first and second resistance elements.

3. A resistance thermometer system, comprising a source of electrical power, a first resistance element having a substantially zero temperature coefficient of resistivity, a second resistance element having a temperature coefficient of resistivity such that the resistivity of said second element changes substantially over a given temperature range, said first and second elements having the same resistance at a predetermined temperature, means connecting said first and second elements in circuit with said source of electrical power, means for developing a stable reference signal, means jointly controlled by said reference signal and an electrical signal derived from said first resistance element for maintaining the voltage supplied to said first resistance element substantially constant, and differential amplifier means controlled in accordance with first and second electrical signals derived from said first and second resistance elements, respectively, for producing an electrical output signal proportional to the difference between said first and second signals.

4. A resistance thermometer system, comprising a source of electrical power, a first resistance element having a substantially zero temperature coefficient of resistivity, a second resistance element having a temperature coefficient of resistivity such that the resistivity of said second element changes substantially over a given temperature range, said first and second elements having the same resistance at a predetermined temperature, means connecting said first and second elements in circuit with said source of electrical power, means for developing a stable reference signal, means jointly controlled by said reference signal and an electrical signal derived from said first resistance element for maintaining the voltage supplied to said first resistance element substantially constant, and magnetic amplifier means controlled in accordance with first and second electrical signals derived from said first and second resistance elements, respectively, for producing a substantially unidirectional output signal proportional to the difference between said first and second signals.

5. A resistance thermometer system, comprising a first resistance element having a substantial temperature coefficient of resistivity, a second resistance element having a substantially zero temperature coefficient of resistivity, said first and second resistance elements having the same resistance at a predetermined temperature, means connecting said first and second resistance elements in series, means for developing a stable reference signal, a magnetic amplifier having a gate winding, a reference winding, and a control winding, means for supplying said reference signal to said reference winding, means for supplying a signal derived from said second resistance element to said control winding, means for deriving from said gate winding a substantially constant current which is supplied to said series connected first and second resistance elements, and means for developing an electrical output signal proportional to the voltage differential across said first and second resistance elements due to said constant current flow therethrough.

6. A resistance thermometer system comprising a temperature measuring unit consisting of a first resistance element having a resistivity which varies with temperature over a predetermined range and a second resistance element having the same resistance as said first resistance element at a predetermined temperature and having a substantially zero temperature coefficient of resistivity and means connecting said first and second resistance elements in series, said unit being replaceable by another similar unit the second resistance element of which has a different resistance value than the second resistance element of said first mentioned unit, means for producing a substantially constant flow of current through said first and second resistance elements, means for developing an electrical output signal proportional to the difference in voltages produced across said first and second elements due to said constant current flow therethrough, a stable reference source, means for developing a control signal proportional to current flow through said zero temperature coefficient resistance element, and means for comparing said control signal with a signal derived from said stable reference source and for employing any difference therebetween to maintain substantially constant the voltage drop produced across said second resistance element due to said current flow therethrough when said first mentioned unit is replaced by said other unit, whereby recalibration of said system upon replacement of said measuring unit is rendered unnecessary.

7. A resistance thermometer system, comprising a source of power, a first resistance element having a substantially zero temperature coefficient of resistivity, a second resistance element having a predetermined temperature coefficient of resistivity, said first and second elements having the same resistance at a predetermined temperature and being connected in circuit with said source of power, means for deriving a first control signal from said first resistance element, means for deriving a second control signal from said second element, means for developing a stable reference signal, means jointly controlled by said reference signal and said first and second control signals for controlling the voltage supplied to said elements from said source of power, and means for comparing an electrical condition of both said first and second elements and producing an output signal proportional to the difference therebetween.

8. A resistance thermometer system, comprising a source of electrical power, a first resistance element having a substantially zero temperature coefficient of resistivity, a second resistance element having a temperature coefficient of resistivity such that the resistivity of said second element changes substantially over a given temperature range, said first and second elements having the same resistance at a predetermined temperature, means connecting said first and second elements in circuit with said source of electrical power, a stable reference signal source, means for deriving a first control signal from said first resistance element, means for deriving a second control signal from said second element, means for comparing a reference signal derived from said reference signal source with both said first and second control signals, means controlled by said comparing means for controlling the energization of said first and second elements from said source of power so that the algebraic sum of said reference signal and said first and second control signals is maintained substantially equal to zero and means for deriving an electrical output signal from said first and second elements proportional to the electrical signal difference therebetween.

9. A resistance thermometer system for simultaneously measuring temperature over both a relatively wide temperature range and a relatively narrow temperature range, comprising a temperature measuring unit consisting of a first resistance element having a resistivity which varies with temperature over said wide temperature range, a second resistance element having the same resistance as said first resistance element at a first predetermined temperature and having a substantially zero temperature coefficient of resistivity, a third resistance element having the same resistance as said first resistance element at a second predetermined temperature and having a substantially zero temperature coefficient of resistivity, a source of power, means connecting said first, second and third elements in circuit with said source of power, a stable reference signal source, means for deriving a control signal from one of said second and third resistance elements, means for comparing said control signal with a reference signal derived from said reference signal source, means controlled by said controlling means for comparing said source of power to maintain the voltage supplied to said one resistance element substantially constant, means for deriving a wide range output signal from said first and second resistance elements, and means for deriving a narrow range output signal from said first and third resistance elements.

10. A resistance thermometer system for developing an electrical output signal proportional to the average of several temperatures, comprising first and second temperature measuring units, each of said units including a first resistance element having a resistivity which varies with temperature connected in series with a second resistance element having the same resistance as said first element at a predetermined temperature and having a substantially zero coefficient of resistivity, means connecting both said measuring units to a source of power, means for deriving a control signal from the second resistance element of one of said measuring units, a stable reference source, means jointly controlled by a signal from said stable reference source and said control signal for controlling said source of power so that the voltage developed across said one second resistance element remains substantially constant, and means for deriving an output signal from both said measuring units which is proportional to the average of the temperatures to which said first elements of said units are subjected.

11. A resistance thermometer system for developing an electrical output signal proportional to the average of several temperatures, comprising first and second temperature measuring units, each of said units including a first resistance element having a resistivity which varies with temperature connected in series with a second resistance element having the same resistance as said first element at a predetermined temperature and having a substantially zero coefficient of resistivity, means connecting both said measuring units to a source of power, means for deriving a control signal from the second resistance element of one of said measuring units, a stabilized reference signal source, means jointly controlled by a signal derived from said stabilized reference signal source and said control signal for controlling said source of power so that the voltage developed across said one second resistance element remains substantially constant, means for developing a first signal proportional to the sum of the temperatures measured by said two measuring units, and means for developing a second output signal from said first output signal which is proportional to the average of said temperatures.

12. A resistance thermometer system for developing an electrical output signal proportional to the difference in temperature at two different locations, comprising first and second temperature measuring units, each of said units including a first resistance element having a resistivity which varies with temperature connected in series with a second resistance element having the same resistance as said first element at a predetermined temperature and having a substantially zero coefficient of resistivity, means connecting both said measuring units to a source of power, means for deriving a control signal from the second resistance element of one of said measuring units, a stable reference signal source, means jointly responsive to a signal derived from said reference source and said control signal for controlling said source of power so that the voltage developed across said one second resistance element remains substantially constant, and means for deriving an output signal from both said measuring units which is proportional to the difference in temperatures to which said two measuring units are subjected.

13. A resistance themometer system, comprising a source of power, a first resistance element having a substantially zero temperature coefficient of resistivity, a second resistance element having a predetermined temperature coefficient of resistivity, said first and second elements having the same resistance at a predetermined temperature and being connected in circuit with said source of power, means for developing a stabilized reference signal, means for developing a control signal proportional to current flow through said first resistance element, means responsive to said stabilized reference signal and said control signal for controlling said source of power so that current through said first resistance element is maintained at a substantially constant value, and means for deriving an electrical output signal from said first and second resistance elements proportional to the electrical signal difference therebetween.

14. A resistance thermometer system, comprising a source of electrical power, a first resistance element having a substantially zero temperature coefficient of resistivity, a second resistance element having a temperature coefficient of resistivity such that the resistivity of said second element changes substantially over a given temperature range, said first and second elements having the same resistance at a predetermined temperature, means connecting said first and second elements in circuit with said source of power so that current therefrom flows through both said elements, means for developing a stabilized reference signal, means for developing a control signal proportional to current flow through said first resistance element, means responsive to said stabilized reference signal and said control signal for controlling said power source to maintain current through said first resistance element at a substantially constant value, and means for deriving an electrical output signal from said first and second elements proportional to the difference between the voltages produced thereacross.

15. A resistance thermometer system, comprising a source of power, a first resistance element having a substantially zero temperature coefficient of resistivity, a second resistance element having a predetermined temperature coefficient of resistivity, said first and second elements having the same resistance at a predetermined temperature and being connected in circuit with said source of power, means for developing a stabilized reference signal, means for devoloping a primary control signal proportional to current flow through said first resistance element, means for developing a secondary control signal which varies in accordance with changes in the resistance of said second resistance element with temperature, means jointly responsive to said stabilized reference signal, said primary control signal and said linearity control signal for controlling said source of power so that the difference between the voltages produced across said first and second resistance elements varies substantially linearly with temperature.

16. A resistance thermometer system, comprising a source of electrical power, a first resistance element having a substantially zero temperature coefficient of resistivity, a second resistance element having a temperature coefficient of resistivity such that the resistivity of said second element changes substantially over a given temperature range, said first and second elements having the same resistance at a predetermined temperature, means connecting said first and second resistance elements in circuit with said source of power so that current therefrom flows through both said elements, means for developing a stabilized reference signal, means for developing a first control signal proportional to current flow through said first resistance element, means for developing a second control signal which varies in accordance with changes in the resistance of said second resistance element with temperature, and means for comprising said stabilized reference signal with said first and second control signals and for employing any difference therebetween to vary said source of power in the direction to minimize such difference.

17. A resistance thermometer system, comprising a source of electrical power, a first resistance element having a substantially zero temperature coefficient of resistivity, a second resistance element having a temperature coefficient of resistivity such that the resistivity of said second element changes substantially over a given temperature range, said first and second elements having the same resistance of a predetermined temperature, means connecting said first and second resistance elements in circuit with said source of power so that current therefrom flows through both said elements, means for developing a stabilized reference signal, means for developing a first control signal proportional to current flow through said first resistance element, means for developing a second control signal which varies in accordance with changes in the resistance of said second resistance element with temperature, and magnetic amplifier means for combining said stabilized reference signal and said first and second control signals and for controlling said source of power to maintain the algebraic sum of said reference signal and said first and second control signals substantially equal to zero.

18. A resistance thermometer system, comprising a source of electrical power, a first resistance element having a substantially zero temperature coefficient of resistivity, a second resistance element the resistance of which varies nonlinearly with temperature over a given temperature range, said first and second elements having the same resistance at a predetermined temperature, means connecting said first and second resistance elements in circuit with said source of power so that current therefrom flows through both said elements, means for developing a stabilized reference signal, means for developing a primary control signal proportional to current flow through said first resistance element, means for developing a linearity control signal which varies in accordance with changes in the resistance of said second resistance element with temperature, means for combining said reference signal, said primary control signal and said linearity control signal, and means employing the output of said combining means to control said source of power so that the difference between the voltages produced across said first and second resistance elements varies substantially linearly with temperature, thereby to correct for the nonlinear characteristic of said second resistance element.

19. A resistance thermometer system, comprising a source of electrical power, a first resistance element having a substantially zero temperature coefficient of resistivity, a second resistance element having a resistance-temperature characteristic the slope of which decreases at higher temperatures, said first and second elements having the same resistance at a predetermined temperature, means connecting said first and second resistance elements in circuit with said source of power so that current therefrom flows through both said elements, means for developing a stabilized reference signal, means for developing a primary control signal proportional to current flow through said first resistance element, means for developing a linearity control signal which varies in accordance with changes in the slope of the resistance-temperature characteristic of said second resistance element, magnetic amplifier means for summing said reference signal, said primary control signal and said linearity signal and controlling said source of power to hold the algebraic sum of said reference signal, said primary control signal and said linearity signal substantially equal to zero.

References Cited in the file of this patent

UNITED STATES PATENTS

| | | |
|---|---|---|
| 1,460,530 | Brown et al. | July 3, 1923 |
| 1,573,850 | Naiman | Feb. 23, 1926 |
| 1,974,187 | Malpass | Sept. 18, 1934 |
| 2,310,955 | Hornfeck | Feb. 16, 1943 |
| 2,359,334 | Smith | Oct. 3, 1944 |
| 2,430,756 | Conrad | Nov. 11, 1947 |
| 2,551,407 | Alder | May 1, 1951 |
| 2,595,881 | Peterson | May 6, 1952 |

OTHER REFERENCES

Roberts: Mechanical Measurements by Electrical Methods, pp. 98–99.

UNITED STATES PATENT OFFICE
CERTIFICATE OF CORRECTION

Patent No. 3,163,042                                     December 29, 1964

George A. O'Sullivan

It is hereby certified that error appears in the above numbered patent requiring correction and that the said Letters Patent should read as corrected below.

Column 15, line 27, for "chainges" read -- changes --; column 16, line 72, for "controlling" read -- comparing --; line 73, for "comparing" read -- controlling --; column 18, line 42, for "jointely" read -- jointly --; line 64, for "comprising" read -- comparing --; column 20, under "UNITED STATES PATENTS", after line 28, insert -- 2,016,660 Weeks---- Oct. 8, 1935 --.

Signed and sealed this 6th day of July 1965.

(SEAL)
Attest:

ERNEST W. SWIDER                                          EDWARD J. BRENNER
Attesting Officer                                             Commissioner of Patents